(12) United States Patent
Suzuki et al.

(10) Patent No.: US 6,692,872 B2
(45) Date of Patent: Feb. 17, 2004

(54) METAL HYDRIDE NEGATIVE ELECTRODE AND METHOD FOR PRODUCING SAME

(75) Inventors: Hiroyuki Suzuki, Ako (JP); Kyoichi Ariga, Ako (JP); Kenichi Kobayashi, Tsukuba (JP); Hiroshi Ogura, Tokyo-To (JP); Nobuyuki Muromachi, Tsukuba (JP); Mieko Nagamori, Koga (JP); Hideki Toshima, Koga (JP)

(73) Assignees: Honda Giken Kogyo Kabushiki Kaisha, Tokyo-To (JP); Japan Metals & Chemicals Co., Ltd., Tokyo-To (JP); Sanoh Kogyo Kabushiki Kaisha, Koga (JP)

( * ) Notice: Subject to any disclaimer, the term of this patent is extended or adjusted under 35 U.S.C. 154(b) by 196 days.

(21) Appl. No.: 09/884,642

(22) Filed: Jun. 19, 2001

(65) Prior Publication Data

US 2002/0012840 A1 Jan. 31, 2002

(30) Foreign Application Priority Data

Jun. 22, 2000 (JP) .......................................... 2000-187727

(51) Int. Cl.⁷ ............................. H01M 4/58; B05D 5/12
(52) U.S. Cl. ...................... 429/218.2; 427/123; 429/137
(58) Field of Search .......................... 429/66, 137, 217, 429/218.2, 232; 427/123

(56) References Cited

U.S. PATENT DOCUMENTS 6,284,409 B1 * 9/2001 Higashiyama et al. ... 429/218.2
6,329,101 B1 * 12/2001 Kawakami ............... 429/218.2

FOREIGN PATENT DOCUMENTS

EP 680107 * 11/1995 .......... H01M/10/34
JP 2001-93520 * 4/2001 ............ H01M/4/24

* cited by examiner

Primary Examiner—Stephen Kalafut
(74) Attorney, Agent, or Firm—Ladas & Parry

(57) ABSTRACT

There is provided a metal hydride negative electrode having excellent discharge characteristics at the beginning of a charge and discharge cycle, excellent gas absorptivity during charge, and an excellent cycle life, and a method for producing the same without the need of any complicated producing processes. The metal hydride negative electrode (1) is used for a nickel hydride cell, and comprises a substrate (2) and a negative electrode plate (3) which is formed by applying a hydrogen absorbing alloy composition containing a hydrogen absorbing alloy powder, a conductive material, a binder and a dispersing agent on the substrate, wherein the negative electrode plate has a surface portion (4) which has a predetermined water repellent rate and a plurality of convex portions.

6 Claims, 7 Drawing Sheets

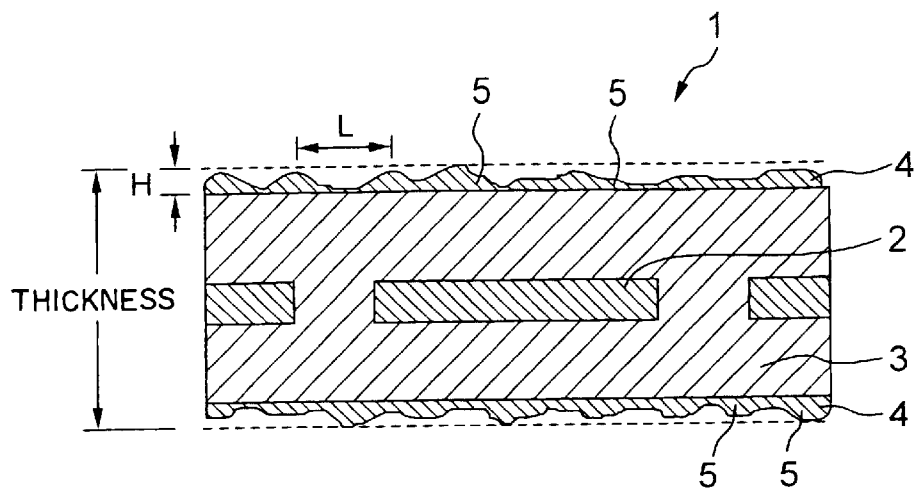
F I G. 1
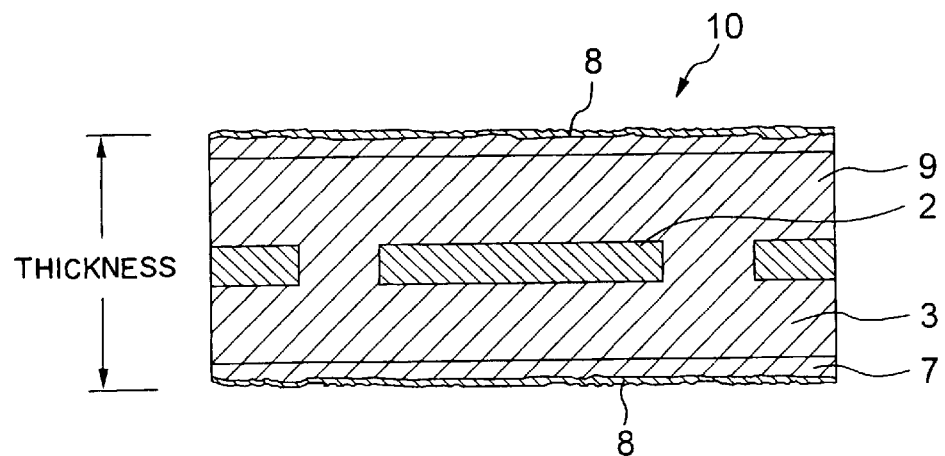
F I G. 2
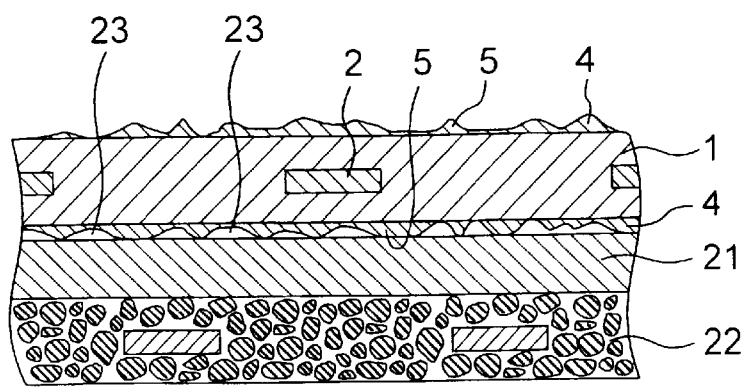
F I G. 3

METAL HYDRIDE NEGATIVE ELECTRODE AND METHOD FOR PRODUCING SAME

BACKGROUND OF THE INVENTION

1. Field of the Invention

The present invention relates generally to a metal hydride negative electrode for use in a nickel hydride, and a method for producing the same. More specifically, the invention relates to a metal hydride negative electrode having excellent discharge characteristics at the beginning of a charge and discharge cycle, an excellent gas absorptivity during charge, and excellent cycle life initial characteristics, and a method for producing the same.

2. Description of the Prior Art

In recent years, many secondary cell capable of being repeatedly charged are used. A nickel hydride cell serving as a typical secondary cell comprises an alkaline electrolyte filled in a cell vessel, a metal hydride negative electrode containing a hydrogen absorbing alloy as a principal component, a positive electrode containing a metallic oxide as a principal component, and a separator provided between the metal hydride negative electrode and the positive electrode.

As characteristics required for nickel hydride cells, there are excellent discharge characteristics at the beginning of a charge and discharge cycle, an excellent gas absorptivity during charge, and an excellent cycle life.

In order to improve these characteristics, many proposals are made. For example, Japanese Patent Laid-Open No. 6-290775 discloses a method for producing a metal hydride electrode, which has improved initial discharge characteristics, an improved gas absorptivity during charge and an improved cycle life, by immersing hydrogen absorbing alloy powder in an alkaline solution to reform the surface thereof and carrying out an alkaline treatment at a higher temperature again while a metal hydride negative electrode is formed.

However, there is a problem in that it takes a lot of time to produce the metal hydride negative electrode described in the publication since it is required to repeatedly carry out alkaline treatments.

For that reason, it is desired to produce a metal hydride electrode having excellent initial discharge characteristics, gas absorptivity during charge and an excellent cycle life without the need of any complicated producing processes.

SUMMARY OF THE INVENTION

It is therefore an object of the present invention to eliminate the aforementioned problems and to provide a metal hydride negative electrode having excellent discharge characteristics at the beginning of a charge and discharge cycle, excellent gas absorptivity during charge, and an excellent cycle life, and a method for producing the same without the need of any complicated producing processes.

In order to accomplish the aforementioned and other objects, after the inventor has diligently studied, the inventor's attention is turned to the fact that the surface portion of a negative electrode plate is formed so as to have a predetermined water repellent rate and a plurality of convex portions, so that the inventor has made the present invention on the basis of this knowledge.

That is, in order to accomplish the aforementioned and other objects, according to one aspect of the present invention, there is provided a metal hydride negative electrode for use in a nickel hydride cell, the metal hydride negative electrode comprising a substrate and a negative electrode plate which is formed by applying a hydrogen absorbing alloy composition containing a hydrogen absorbing alloy powder, a conductive material, a binder and a dispersing agent on the substrate, wherein the negative electrode plate has a surface portion which has a predetermined water repellent rate and a plurality of convex portions.

The surface portion may absorb a volume expansion portion, which is produced by repeating charge and discharge cycles, to cause the convex portions to disappear to be flattened.

Preferably, the predetermined water repellent rate exceeds 40%.

The convex portions may be formed on the basis of the difference in specific gravity between the hydrogen absorbing alloy powder, the conductive material, the binder and the dispersing agent in the hydrogen absorbing alloy composition.

Preferably, the conductive material is carbon powder, the binder is a polytetrafluoroethylene, the dispersing agent is water.

The convex portions may mainly comprise the conductive material and the binder.

Preferably, the convex portions have a height of 15 to 55 μm, and the distance between adjacent two of the convex portions is in the range of from 1.3 mm to 4.8 mm.

According to another aspect of the present invention, there is provided a method for producing a metal hydride negative electrode for use in a nickel hydride cell, the method comprising the steps of: arranging a substrate on an application table; producing a paste-like hydrogen absorbing alloy composition containing a hydrogen absorbing alloy powder, a conductive material, a binder and a dispersing agent; and applying the hydrogen absorbing alloy composition on the substrate to dry and press the hydrogen absorbing alloy composition to form a negative electrode plate, wherein at the step of producing the hydrogen absorbing alloy composition, the amount of the dispersing agent with respect to the amount of the hydrogen absorbing alloy powder is set to be a predetermined part by weight so that the negative electrode plate has a surface portion having a water repellent property and a plurality of convex portion.

Preferably, the dispersing agent is water, and the amount of the dispersing agent is in the range of from 30 to 60 parts by weight with respect to 100 parts of the hydrogen absorbing alloy powder by weight.

At the step of arranging the substrate on the application table, the substrate may be horizontally arranged on the application table.

As described above, according to the present invention, the surface portion of the negative electrode plate has a predetermined water repellent rate and a plurality of convex portions. If the surface portion of the negative electrode thus has the predetermined water repellent rate and the plurality of convex portions, it is possible to provide a metal hydride negative electrode without the need of any complicated producing processes, by utilizing the difference in specific gravity between components of the hydrogen absorbing alloy composition and by setting the amount of the dispersing agent to be a predetermined part by weight with respect to the hydrogen absorbing alloy powder.

In the final stage of charge and during overcharge, oxygen gas is produced. This oxygen gas is dispersed toward the metal hydride negative electrode via the separator. In this case, if the surface portion of the metal hydride negative electrode has a high water repellent property, the surface portion is easy to absorb oxygen gas, so that the oxygen gas trapped into the surface portion recombines with hydrogen atoms which are absorbed into the metal hydride negative electrode, thereby inhibiting the internal pressure rise in the cell vessel.

If charge is started, the charging voltage rises with the elapse of time. In the final stage of charge, the charging voltage reaches the maximum charging voltage, so that the charging voltage rise is stopped. When oxygen gas effectively recombines with hydrogen atoms, heat is generated to raise the temperature in the cell vessel, so that there is caused a phenomenon that the charging voltage drops immediately after the charging voltage reaches the maximum charging voltage. By utilizing this phenomenon, it is possible to very surely and easily detect the charging time until the charging voltage reaches the maximum charging voltage. Therefore, by effectively causing the recombination of oxygen gas with hydrogen atoms in the metal hydride alloy electrode, it is possible to surely detect the maximum charging voltage to timely control the termination of charge, so that it is possible to surely avoid overcharge and increase the cycle life.

When charge and discharge cycles are repeated, a large number of hydrogen atoms, which do not contribute to discharge, accumulate in the hydrogen absorbing alloy. The plurality of fine convex portions existing on the surface portion of the metal hydride negative electrode absorbs the volume expansion to prevent the thickness of the electrode and to inhibit the separator from being pressed and crushed in the cell vessel in a direction perpendicular to the separator, so that it is possible to prevent the decrease of the amount of the electrolyte arranged between the positive electrode and the metal hydride negative electrode, i.e., the amount of the electrolyte contained in the separator. As a result, it is possible to inhibit the lowering of the discharging voltage, so that it is possible to increase the cycle life.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIG. 1 is a sectional view showing a preferred embodiment of a metal hydride negative electrode according to the present invention before it is almost dead;

FIG. 2 is a sectional view showing a preferred embodiment of a metal hydride negative electrode according to the present invention when it is almost dead after charge and discharge cycles are repeated;

FIG. 3 is a sectional view showing the state that a metal hydride negative electrode according to the present invention, a separator and a positive electrode are stacked up;

DESCRIPTION OF THE PREFERRED EMBODIMENTS

Figure 4:
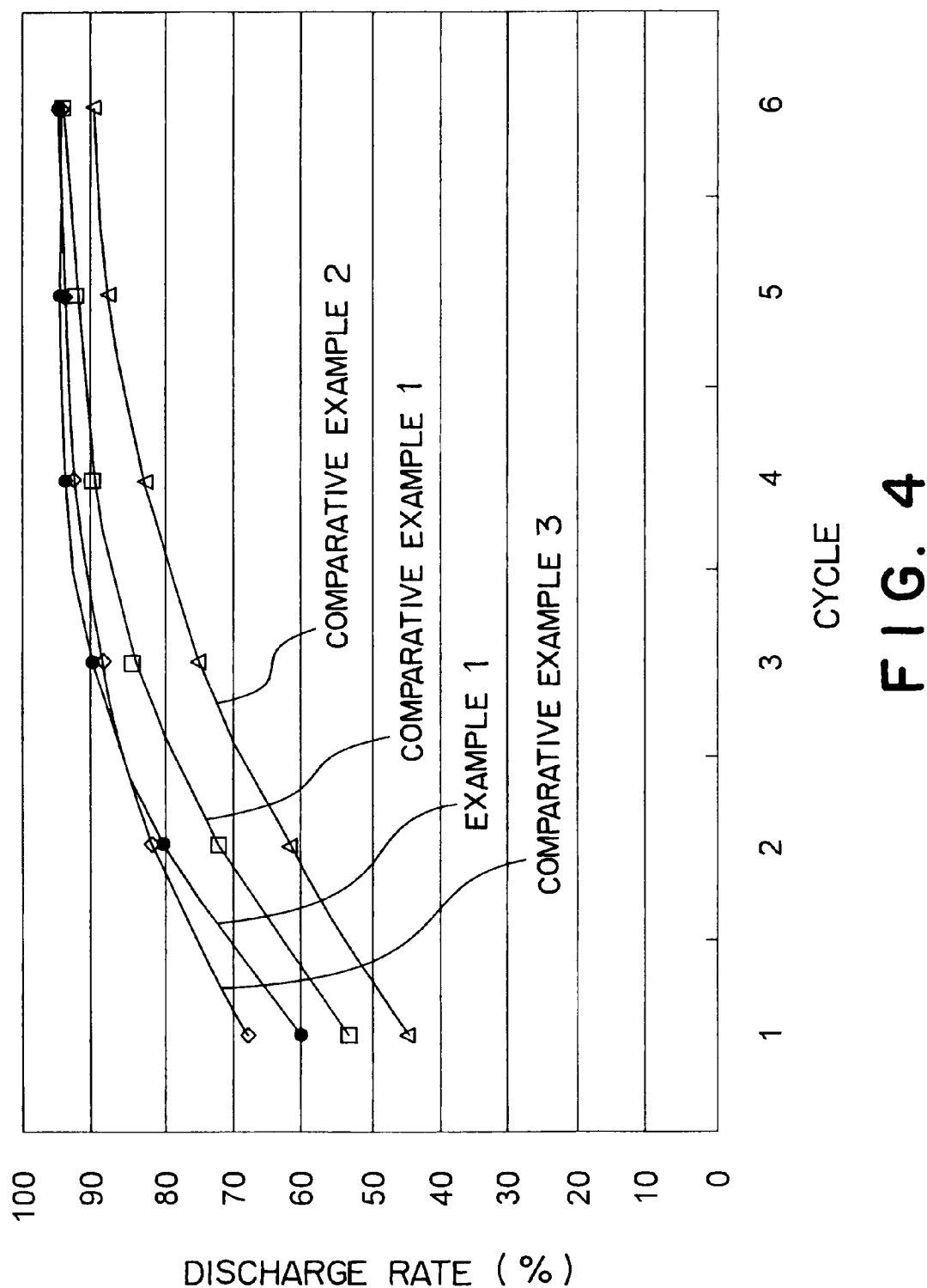
FIG. 4 is a graph showing the relationship between the numbers of cycles and discharge rates in initial activity tests in examples.

Referring now to the accompanying drawings, the preferred embodiments of the present invention will be described below.

A nickel hydride cell comprises an alkaline electrolyte filled in a cell vessel, a metal hydride negative electrode containing a hydrogen absorbing alloy as a principal component, a positive electrode containing a metallic oxide as a principal component, and a separator provided between the metal hydride negative electrode and the positive electrode. As shown in FIG. 3, a metal hydride negative electrode 1, a separator 21 and a positive electrode 22 are stacked up. Such stacked members are spirally wound to be provided in a cell vessel.

FIG. 1 is a local sectional view showing an example of an initial metal hydride negative electrode 1 before charge and discharge cycles are repeated. As shown in FIG. 1, the metal hydride negative electrode 1 comprises an Ni substrate 2 of a punching metal having spaced through holes, and a negative electrode plate 3 which is formed by applying a paste hydrogen absorbing alloy composition on both sides of the Ni substrate 2.

The hydrogen absorbing alloy composition is formed by kneading hydrogen absorbing alloy powder, a conductive material, a binder and a dispersing agent. The surface portion 4 of the negative electrode plate is formed of a material having a water repellent property, and a plurality of fine convex portions are formed on the surface portion 4. Since the surface portion 4 is formed of the material having a water repellent property, the surface portion 4 has a predetermined high water repellent property. As the materials of the surface portion 4 having a water repellent property, there are materials mainly comprising a conductive material and a binder. For example, the binder is carbon powder, and the binder is a polytetrafluoroethylene (PTFE).

Thus, according to the present invention, the surface portion 4 is formed so as to have a water repellent property, and the surface portion 4 is formed so as to have the plurality of fine convex portions 5. As will be described later, such a surface portion 4 can be formed by utilizing the difference in specific gravity between the hydrogen absorbing alloy powder, the conductive material, the binder and the dispersing agent in a process for applying the paste hydrogen absorbing alloy composition on the Ni substrate 2.

As will be described later, the surface portion 4 has a water repellent rate which is higher than 40%, preferably higher than 50%, more preferably higher than 60%. In general, oxygen gas is generated in the positive electrode 22 in the final stage of charge and during overcharge. This oxygen gas is dispersed toward the metal hydride negative electrode 1 via the separator 21. In this case, the surface portion 4 of the metal hydride negative electrode 1 ha the high water repellent rate, so that the surface portion 4 is easy to trap oxygen gas. The oxygen gas trapped in the surface portion 4 reacts and combines with hydrogen atoms, which is absorbed into the metal hydride negative electrode 1, in the metal hydride negative electrode 1 again to produce water. Thus, oxygen gas is easily trapped in the surface portion 4, so that the internal pressure rise in the cell vessel can be suppressed in the final stage of charge and during overcharge.

Although voltage raises with the elapse of time if charge is started, the voltage reaches the maximum charging voltage in the final stage of charge, so that the charging voltage rise stops. When the recombination of oxygen gas with hydrogen gas in the metal hydride negative electrode effectively occurs, heat is generated to raise temperature in the cell vessel, so that there is caused a phenomenon that the charging voltage drops immediately after the charging voltage reaches the maximum charging voltage. By utilizing this phenomenon, it is possible to detect the charging time until the charging voltage reaches the maximum charging voltage. According to the present invention, the recombination of oxygen gas with hydrogen gas effectively occurs, so that the phenomenon that the charging voltage drops immediately after reaching the maximum charging voltage is very surely caused. Therefore, it is possible to surely detect the maximum charging voltage to timely control the termination of charge, so that it is possible to surely avoid overcharge.

FIG. 2 is a local sectional view showing a metal hydride negative electrode 10 when it reaches its cycle life after charge and discharge cycles are repeated to irreversibly absorb a large amount of hydrogen into the hydrogen absorbing alloy. As shown in FIG. 2, the plurality of fine convex portions 5 having existed on the surface portion 4 of the metal hydride negative electrode 1 disappear on the surface of the metal hydride negative electrode 10 when it reaches its cycle file, and the surface portion 4 is flattened to form a flattened portion 8. In general, when charge and discharge cycles are repeated, a large number of hydrogen atoms, which do not contribute to discharge, accumulate in the hydrogen absorbing alloy of the metal hydride negative electrode to allow the hydrogen absorbing alloy fine grains to crack to cause volume expansion to increase the thickness of the electrode, so that the metal hydride negative electrode 1 may crack in the cell vessel. On the other hand, according to the present invention, at the beginning of a charge and discharge cycle, the plurality of fine convex portions 5 form cavities 23 between the surface portion 4 of the metal hydride negative electrode 1 and the surface of the separator 21 as shown in FIG. 3, so that the cavities 23 can absorb volume expansion due to the repetition of charge and discharge cycles. As a result, the separator in the cell vessel is inhibited from being pressed and crushed in a direction perpendicular to the separator, so that it is possible to prevent the decrease of the amount of the electrolyte arranged between the positive electrode and the metal hydride negative electrode, i.e., the amount of the electrolyte contained in the separator. As a result, it is possible to inhibit the lowering of the discharging voltage, so that it is possible to increase the cycle life.

A method for producing the metal hydride negative electrode 1 will be described below.

First, an Ni substrate 2 is horizontally arranged on an application table. Then, hydrogen absorbing alloy powder, carbon powder serving as a conductive material, a polytetrafluoroethylene (PTFE) serving a binder, a thickener which is used if necessary, and water serving as a dispersing agent are kneaded to produce a paste hydrogen absorbing alloy composition. Then, the hydrogen absorbing alloy composition is applied on the Ni substrate 2 to be dried to form a negative electrode plate 3. Thereafter, the negative electrode plate 3 is rolled and pressed to form a plurality of fine convex portions 5 on a surface portion 4.

At the step of applying the paste hydrogen absorbing alloy composition on the Ni substrate 2 and at the step of drying the composition, the amount of water serving as the dispersing agent is adjusted to allow carbon powder and PTFE to be biased on the surface of the negative electrode plate 3 using the difference in specific gravity between carbon powder, PTFE and the hydrogen absorbing alloy. Since both of the carbon powder serving as the conductive material and the PTFE serving as the binder have a high water repellent property, the surface of the negative electrode plate 3 can have a high water repellent property by biasing the carbon powder and PTFE on the surface of the negative electrode plate 3.

The biasing of the carbon powder and PTFE is carried out by using the difference in specific gravity between the carbon powder, PTFE and the hydrogen absorbing alloy. The degree of the biasing of the carbon powder and PTFE is adjusted by adjusting the amount of water serving as the dispersing agent when the paste hydrogen absorbing alloy composition is prepared. When the paste hydrogen absorbing alloy composition is prepared, the amount of water is preferably in the range of 30 parts by weight to 60 parts by weight with respect to 100 parts of hydrogen absorbing alloy powder by weight.

The degree of the biasing of the carbon powder and PTFE can also be adjusted by controlling a method for applying the paste hydrogen absorbing alloy composition. For example, the applying methods include a horizontal application and a vertical application. The horizontal application is a method for horizontally arranging an Ni substrate 2 on an application table to apply a paste thereon, and the vertical application is a method for vertically arranged an Ni substrate 2 on an application table to apply a paste thereon.

As will be described later, the paste applying method using the horizontal application is more effective in the distribution and formation of the convex portions 5 on the surface portion 4. However, if the amount of water is set to be in the range of from 50 parts by weight to 60 parts by weight with respect to 100 parts of hydrogen absorbing alloy powder by weight when the paste hydrogen absorbing alloy composition is prepared, the vertical application can also distribute and form the convex portions 5 on the surface portion 4 and allow the surface of the negative electrode plate 3 to have a high water repellent property.

The height H of the convex portions 5 is preferably in the range of from 15 $\mu$m to 55 $\mu$m, more preferably in the range of from 15 $\mu$m to 40 $\mu$m. The distance L between adjacent convex portions is preferably in the range of from 1.3 mm to 4.8, more preferably in the range of from 1.5 mm to 3.5 mm. If the height H is less than 15 $\mu$m or exceeds 55 $\mu$m, or if the distance L is less than 1.3 mm or exceeds 4.8 mm, it has been found from the results of experiments that the surface portion 4 can not have a sufficient water repellent property or the cavities 23 between the surface portion 4 and the surface of the separator 21 can sufficiently absorb the volume expansion of the electrode plate 3 due to the repetition of charge and discharge cycles. The height of the convex portions 5 means the length from the flat portion of the electrode plate 3 to the vertex of each of the convex portions 5, and the distance between the convex portions 5 means the distance between the vertexes of adjacent convex portions 5. According to the results of experiments, such convex portions 5 are preferably formed on the surface portion of the negative electrode plate 3 at an area density of 50 to 70/cm$^2$ in order to obtain a high water repellent property and the property of efficiently absorbing the volume expansion portion.

As will be described later, the water repellent rate (%) means a ratio (height of sphere/diameter of sphere) obtained by dropping an electrolyte on the surface of the surface portion 4 to form a spherical droplet to measure the height and diameter of the spherical droplet.

According to the metal hydride negative electrode 1 in the above described preferred embodiment, in the negative electrode plate 3 except for the surface portion 4 on which the convex portions 5 are formed, the packing density of the hydrogen absorbing alloy particulate is high, and the quantities of the carbon powder serving as the conductive material and the PTFE serving as the binder are optimum, so that the binding property between the hydrogen absorbing alloy powders and the binding property between the hydrogen absorbing alloy powder and the Ni substrate 2 are good, thereby decreasing the contact electrical resistance. In addition, since the carbon powder and PTFE having a high water repellent property are not excessively localized in the negative electrode plate 3, the high water repellent property of the PTFE and so forth prevents the negative electrode plate 3 from being difficult to contact the electrolyte, so that the negative electrode plate 3 can effectively incorporate hydrogen ions in the electrolyte. As these results, the discharge characteristic is good at the beginning of a charge and discharge cycle.

Since the surface portion 4 has the high water repellent property, the gas absorptivity can be good during charge, so that it is possible to improve the hydrogen gas absorbing rate during charge and the oxygen gas consuming rate during overcharge. Then, the surface portion 4 can efficiently trap oxygen gas to efficiently recombine the trapped oxygen gas with hydrogen atoms absorbed into the metal hydride negative electrode 1 to inhibit the internal pressure rise in the cell vessel. It is also possible to surely detect the maximum charging voltage on the basis of heat generated by the recombination, so that it is possible to timely control the termination of charge.

Since the plurality of fine convex portions 5 are formed on the surface portion 4, the cavities 23 formed between the surface portion 4 and the surface of the separator 21 can absorb the volume expansion of the negative electrode plate 3 due to the repetition of charge and discharge cycles, so that the thickness of the negative electrode plate 3 can hardly vary. For that reason, it is possible to prevent the separator 21 from being crushed during charge to deplete the electrolyte, so that the cycle life can be very good.

Since the thickness of the negative electrode plate 3 can hardly vary, it is not required to lower the tension of the negative electrode, separator and positive electrode in view of the expansion of the negative electrode plate when they are wound unlike conventional metal hydride negative electrodes, so that it is possible to prevent the negative electrode plate from cracking due to the lowering of the tension. As a result, it is possible to prevent the metal hydride negative electrode 1 from being pressed to crack in the cell vessel, so that it is possible to increase the cycle life.

The present invention will be described below in more detail on the basis of examples. However, the present invention should not be limited to the examples.

Example 1

After predetermined amounts of samples of Mm (Misch metal), Ni, Co, Mn and Al were weighted to be mixed, the mixture was fused by the arc fusing method to prepare a hydrogen absorbing alloy having an alloy composition of 4.0 MmNi, 0.4 CO, 0.3 Mn and 10.3 Al. This alloy was heat-treated at 1000° C. in an atmosphere of Ar for 10 hours to be mechanically ground to produce fine particles having a mean particle diameter of 34 $\mu$m. To 100 parts of this hydrogen absorbing alloy powder by weight, 1 part of carbon powder by weight serving as a conductive material, an appropriate amount of carboxymethyl cellulose sodium salt (CMC) serving as a thickener, 5 parts of a polytetrafluoroethylene (PTFE) by weight serving as a binder, and 60 parts of water by weight serving as a dispersing agent are mixed to be kneaded to prepare a paste of the hydrogen absorbing alloy composition.

Among the hydrogen absorbing alloy powder, the carbon powder serving as the conductive material, carboxymethyl cellulose sodium salt (CMC) serving as the thickener, the polytetrafluoroethylene (PTFE) serving as the binder and water serving as the dispersing agent, the carbon powder and polytetrafluoroethylene (PTFE) have a smaller specific gravity than those of the hydrogen absorbing alloy powder and so forth. As described above, the carbon powder and polytetrafluoroethylene (PTFE) are materials having a high water repellent property when they are solidified.

Such a paste was applied by the horizontal application on both sides of an Ni substrate 2 (pore size; 1.0 mm, thickness; 0.1 mm) of a punching metal serving as a conductive supporting member. Then, the paste was dried at a temperature of 80° C. Thus, the carbon powder and PTFE were biased on the surface portion 4 of the negative electrode plate due to the difference in specific gravity. In this stage, although a plurality of convex portions 5 of carbon powder and polytetrafluoroethylene (PTFE) were formed in the surface portion 4 of the dried negative plate, pores were also simultaneously formed by the draining of water serving as the dispersing agent. Then, the surface portion 4 of the dried negative electrode plate was rolled by a roll pressing machine. Thus, the pores formed by the draining of water serving as the dispersing agent were filled up to distribute and form convex portions 5 on the surface portion 4 of the negative electrode plate 3 at an area density of 60/cm² to prepare a metal hydride negative electrode having a thickness of 0.37 mm. The height of the convex portions was in the range of from 15 $\mu$m to 40 $\mu$m, and the distance between adjacent convex portions was in the range of from 1.5 mm to 3.5 mm. The density of the hydrogen absorbing alloy was 5.0 g/cc.

Then, the alloy density of the hydrogen absorbing alloy composition and the water repellent rate on the surface of the obtained metal hydride negative electrode were measured. The results thereof are shown in Table 1. In Table 1, the electrode thickness (mm) is an apparent thickness in view of the height of the convex portions 5, and the alloy density (g/cc) is an apparent alloy density.

The water repellent rate of the surface portion 4 of the negative electrode plate 3 was measured as follows.

An 8N of KOH solution was dropped on the surface portion 4 of the negative electrode plate 3 of the metal hydride negative electrode. At this time, the height (a) and diameter (b) of a droplet on the surface portion 4 were measured, and it was assumed that the water repellent rate=[(a)/(b)]×100%, since the ratio of the height of the droplet to the diameter thereof increases as the water repellent rate of the surface portion 4 increases.

The number of the convex portions 5 distributed and formed on the obtained surface portion 4, the height of the convex portions 5, the distance between adjacent convex portions 5, the thickness of the electrode, the density of the alloy, and the water repellent rate were measured. The measured results are shown in Table 1.

Comparative Example 1

A metal hydride negative electrode was prepared in the same manner as that in Example 1, except that a paste-like hydrogen absorbing alloy composition was applied by the vertical application in place of the horizontal application in Example 1. Similar to Example 1, the number of convex portions 5 of the obtained negative electrode, the height of the convex portions 5, the distance between adjacent convex portions 5, the thickness of the electrode, the density of the alloy, and the water repellent rate were measured. The measured results are shown in Table 1.

Comparative Example 2

A metal hydride negative electrode was prepared in the same manner as that in Example 1, except that the amount of water serving as a dispersing agent was 30 parts by weight to prepare a paste and that the paste was applied by the vertical application. The negative electrode thus obtained had no convex portions, and was flat. Similar to Example 1, the thickness of the obtained negative electrode, the density of the alloy and the water repellent rate were measured. The measured results are shown in Table 1.

Comparative Example 3

Similar Comparative Example 2, the amount of water serving as a dispersing agent was set to be a smaller amount of 30 parts by weight. However, the density (g/cc) of the alloy was set to be 6 to apply a paste containing alloy powder having an amount 1.2 times as much as that in Comparative Example 2. Since the amount of water serving as the dispersing agent was 30 parts by weight which was equal to that in Comparative Example 2, it is considered that carbon powder and PTFE in Comparative Example 3 are more easily biased by the difference in specific gravity than Comparative Example 2 by the greater density of the alloy. In fact, it was not observed that convex portions were formed on the obtained negative electrode plate, and the surface portion was flat. Therefore, when the amount of water serving as the dispersing agent was set to be a smaller amount of 30 parts by weight, even if the density of the alloy was set to be slightly higher, this is not effective. Similar to Example 1, the thickness of the obtained negative electrode, the density of the alloy and the water repellent rate were measured. The measured results are shown in Table 1.

Comparative Example 4

A metal hydride negative electrode was prepared in the same manner as that in Example 1, except that the amount of water serving as a dispersing agent was 40 parts by weight. The negative electrode thus obtained had no convex portions, and the surface portion was flat. Similar to Example 1, the thickness of the obtained negative electrode, the density of the alloy and the water repellent rate were measured. The measured results are shown in Table 1.

Comparative Example 5

A metal hydride negative electrode was prepared in the same manner as that in Comparative Example 4, except that a paste was applied by the vertical application. The degree of convex portions 5 and the water repellent rate was smaller than those in Comparative Example 4. It is considered that the reason for this is the difference from the horizontal application in Comparative Example 4. Similar to Example 1, the thickness of the obtained negative electrode, the density of the alloy and the water repellent rate were measured. The measured results are shown in Table 1.

TABLE 1

|  | Ex. 1 | C. Ex. 1 | C. Ex. 2 | C. Ex. 3 | C. Ex. 4 | C. Ex. 5 |
| --- | --- | --- | --- | --- | --- | --- |
| Amount Of Water (Parts By Weight) | 60 | 50 | 30 | 30 | 40 | 40 |
| Paste Applying Method | h | v | v | v | h | h |
| Thickness Of Electrode (mm) | 0.37 | 0.37 | 0.37 | 0.37 | 0.37 | 0.37 |
| Density Of Alloy (g/cc) | 5 | 5 | 5 | 6 | 5 | 5 |
| Number Of Convex Portions (/cm$^2$) | 60 | 50 | Non | Non | 50 | 30 |
| Height Of Convex Portion ($\mu$m) | 15–40 | 5–20 | — | — | 5–20 | 3–15 |
| Distance Between Convex Portions (mm) | 0.5–3 | 0.5–3 | — | — | 0.5–3 | 0.5–3 |
| Water Repellent Rate (%) | 60 | 60 | 30 | 40 | 50 | 40 |

(C. Ex.: Comparative Example, h: horizontal Application, v: Vertical Application)

As can be seen from the results shown in Table 1, the convex portions 5 were sufficiently formed on the surface portion 4 in Example 1 and Comparative Example 1 wherein the amount of wafer serving as the dispersing agent was 60 parts by weight with respect to 100 parts of alloy powder by weight during the preparation of the paste.

In Comparative Example 1, the number of the convex portions 5 formed on the surface portion 4 was smaller and the height of the convex portions 5 was lower than those in Example 1 because of the difference in the paste applying method, the horizontal or vertical application. The reason for this is that if the paste is applied by the horizontal application during the application and drying of the paste as Example 1, the difference in specific gravity between components in the paste more easily becomes obvious than that in the case of the vertical application, so that carbon powder and polytetrafluoroethylene having a smaller specific gravity easily rise to the surface portion 4 of the negative electrode plate 3 to be biased.

In Comparative Example 4 wherein the amount of water was 40 parts by weight with respect to 100 parts of alloy powder by weight during the preparation of the paste, although the convex portions 5 were formed, the number of the convex portions was smaller and the height of the convex portions 5 was lower than those in Example 1. It is considered that the reason for this is that if carbon powder and PTFE are intended to be biased on the basis of the difference in specific gravity between the respective components in the paste, the degree of obviousness is lowered since the amount of water serving as a dispersion medium is smaller than that in Example 1.

In Example 1 wherein the height of the convex portions 5 is highest among Example 1 and Comparative Examples 1, 2, 4 and 5 wherein the density of the hydrogen absorbing alloy is the same, the water repellent rate of the surface portion 4 of the negative electrode plate 3 is higher than Comparative Examples 1, 2, 4 and 5.

It can be considered that the high water repellent property gives that a larger amount of carbon powder and PTFE having a high water repellent property are biased on the surface portion 4 when being dried and solidified, and that the convex portions 5 are easily formed if the larger amount of carbon powder and PTFE are biased on the surface portion 4.

In Comparison Example 3, the convex portions are not formed although the density of the hydrogen absorbing alloy is higher than that in Example 1. On the other hand, in Example 1, the water repellent rate is higher than that in Comparative Example 3. This shows that it is effective to increase the amount of water serving as the dispersion medium and carry out the horizontal application to make the difference in specific gravity between components in the paste obvious.

Then, each of the negative electrodes in Example 1 and Comparative Examples 1 through 3 was sandwiched between paste-like positive electrodes 2 via a separator to be fixed by applying a predetermined pressure thereto, and immersed in an 8N of KOH solution. Then, the single-electrode evaluation was carried out with respect to each of the metal hydride negative electrodes. The contents of the single-electrode test include an initial activity test for measuring service capacities with respect to the number of cycles for repeating charge and discharge, and a high rate discharge test for measuring service capacities with respect to current densities. The results thereof are shown in FIGS. 4 and 5.

As shown in FIG. 4, in the results of the initial activity test, when the respective negative electrodes in Example 1 and Comparative Examples 1 and 2 wherein the density of the hydrogen absorbing alloy is the same were compared, the negative electrode in Example 1 was most quickly activated to have excellent initial characteristics. The reason for this is that the biased amount of carbon and PTFE on the surface portion 4 of the negative electrode 3 increases and only an appropriate amount of carbon serving as the conductive material exists in the negative electrode 3 to improve the binding property between the fine hydrogen absorbing alloy particles and the binding property between the hydrogen absorbing alloy powder and the Ni substrate 2 to decrease the contact electrical resistance to lower the internal resistance of the negative electrode 3.

Figure 5:
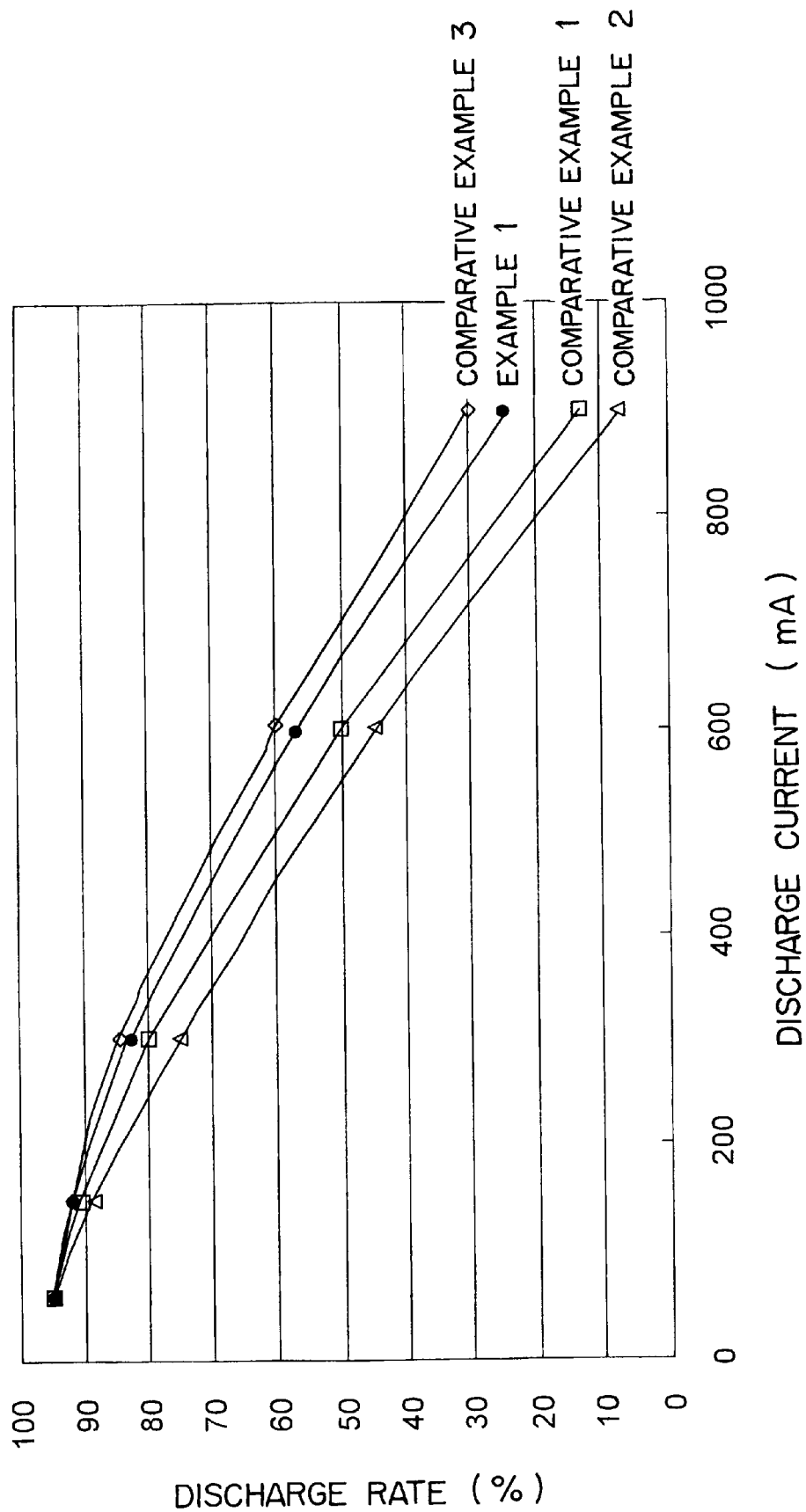
FIG. 5 is a graph showing the relationship between current densities and discharge rates in high rate discharge tests in examples.

In the results of the high rate discharge test shown in FIG. 5, the negative electrode in Example 1 has a higher discharge rate than that in Comparative Examples 1 and 2 wherein the density of the hydrogen absorbing alloy is the same although it has a lower discharge rate than that in Comparative Example wherein the density of the hydrogen absorbing alloy is higher. The reason for this is that the binding property between the fine hydrogen absorbing alloy particles and the binding property between the hydrogen absorbing alloy powder and the Ni substrate 2 are improved to lower the internal resistance of the negative electrode plate 3. The reason for this is also that since PTFE and so forth are localized in the surface portion of the negative electrode plate 3, the high water repellent property of PTFE and so forth prevents the negative electrode plate 3 from contacting the electrolyte in the negative electrode plate 3, so that the negative electrode plate 3 can effectively incorporate hydrogen ions in the electrolyte to lower the internal resistance of the negative electrode plate 3.

Then, each of the respective negative electrodes in Example 1 and Comparative Examples 1 through 3 was wound via a separator to be put in a cylindrical vessel to be connected to a lead. Then, the cylindrical vessel was filled with an 8N of KOH solution to be closed, and cylindrical cells were used for carrying out cycle characteristic tests. The results of the variation in cell internal pressure due to charge and discharge cycles, the internal resistance, the decrease of the weight of the cell, and the coefficient of use are shown in FIGS. 6 through 9.

Figure 6:
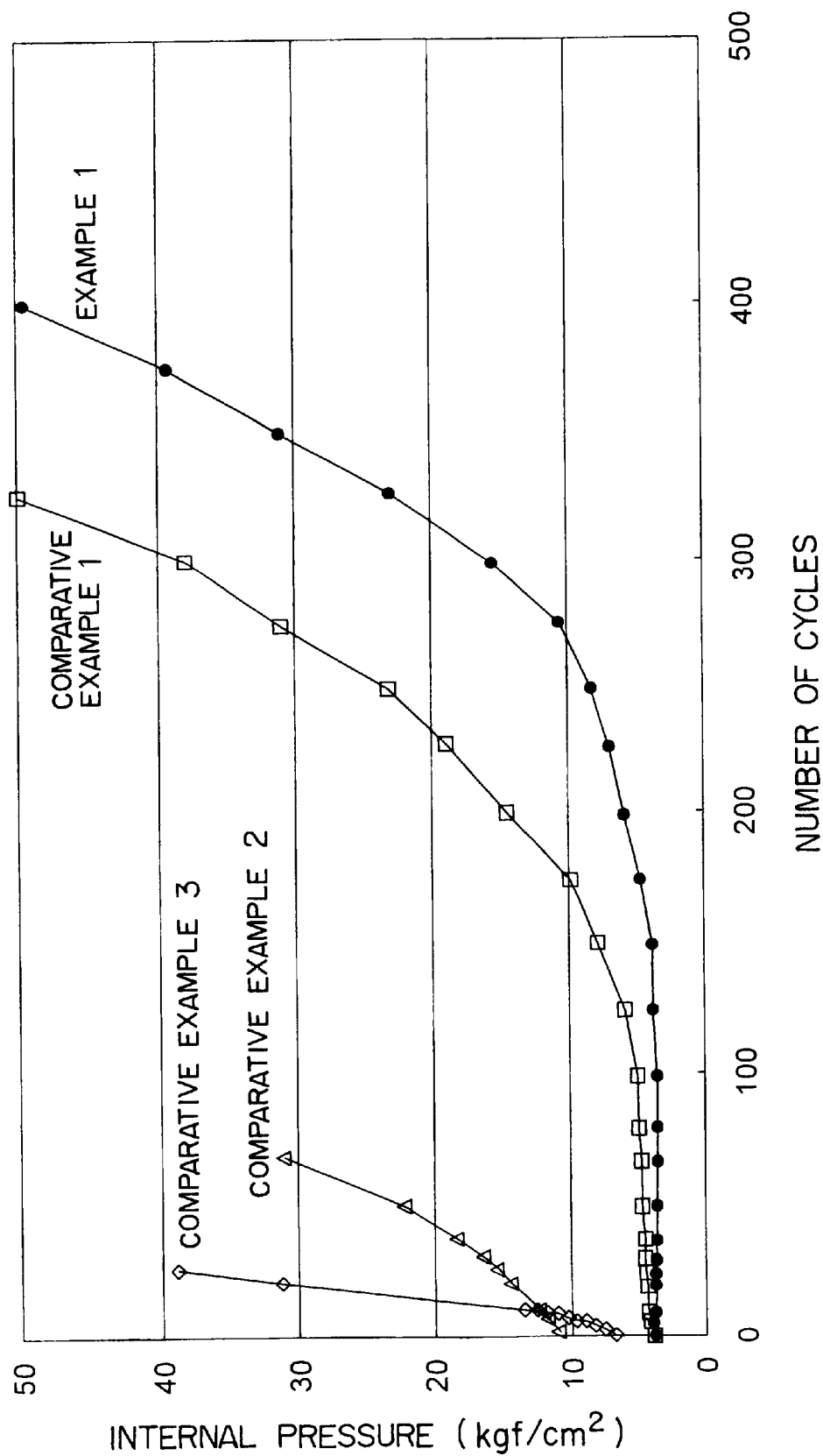
FIG. 6 is a graph showing the variation in cell internal pressure in high rate charge test in examples.

As shown in FIG. 6, the internal pressure rise with respect to the cycle is minimum in Example 1. The reason for this is that the surface portion 4 of the negative electrode plate 4 in Example has the highest water repellent property as compared with other negative electrodes and most appropriately has convex portions 5 as compared with other negative electrodes (see Table 1).

That is, since the surface portion 4 has the high water repellent property, oxygen gas generated in the positive electrode 22 in the final stage of charge and during overcharge passes through the separator 21 to be dispersed toward the metal hydride negative electrode 1. However, since the surface portion 4 has the high repellent property, oxygen gas can be efficiently trapped, and the trapped oxygen gas in the surface portion 4 can recombine with hydrogen atoms to produce water to inhibit the internal pressure in the cell vessel from rising.

In addition, hydrogen atoms which do not contribute to discharge are accumulated in the hydrogen absorbing alloy particles with the repetition of charge and discharge cycles to gradually expand the volume. However, since the plurality of fine convex portions 5 are formed in the surface portion 4, the cavities 23 formed between the surface portion 4 and the surface of the separator 21 can absorb the volume expansion with the repetition of charge and discharge cycles to prevent the thickness of the negative electrode plate 3 from varying. Therefore, the electrolyte in the separator 21 is not pushed out, so that the separator 21 in the cell vessel is inhibited from being pushed and crashed in a direction perpendicular to the separator 21.

Figure 7:
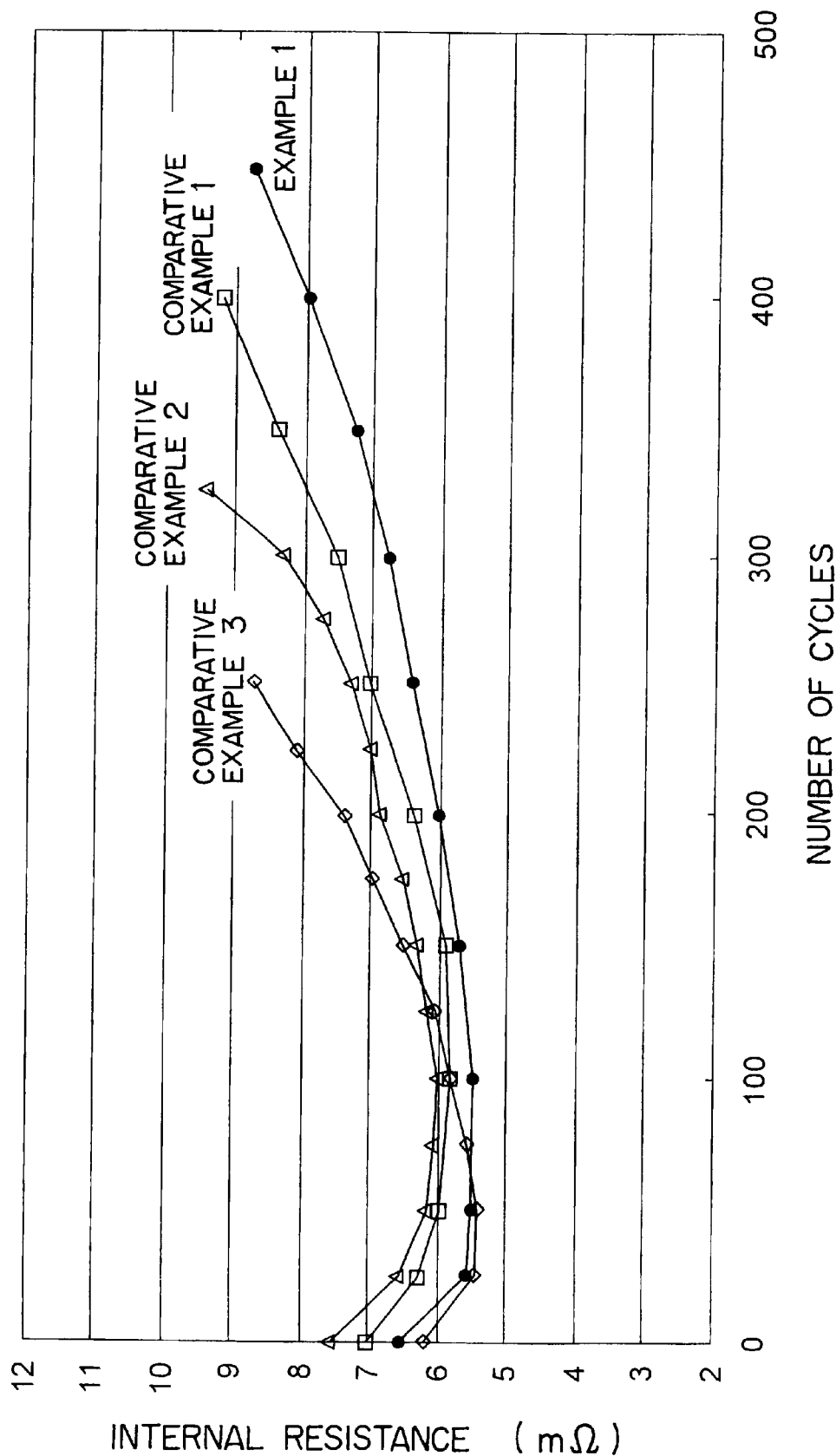
FIG. 7 is a graph showing the variation in cell internal pressure in cycle characteristic tests in examples.
Figure 8:
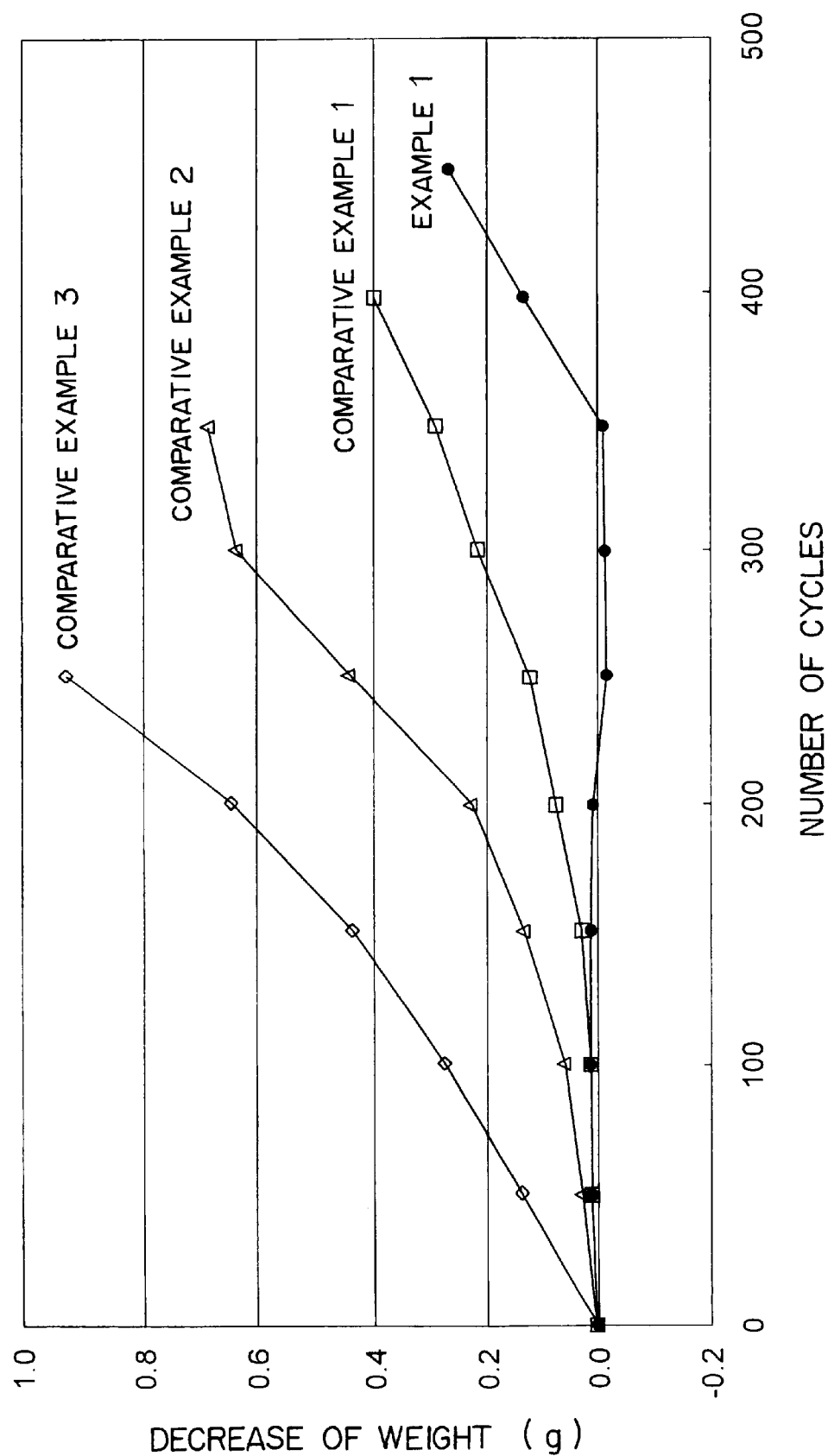
FIG. 8 is a graph showing the variation in cell weight in cycle characteristic tests in examples.
Figure 9:
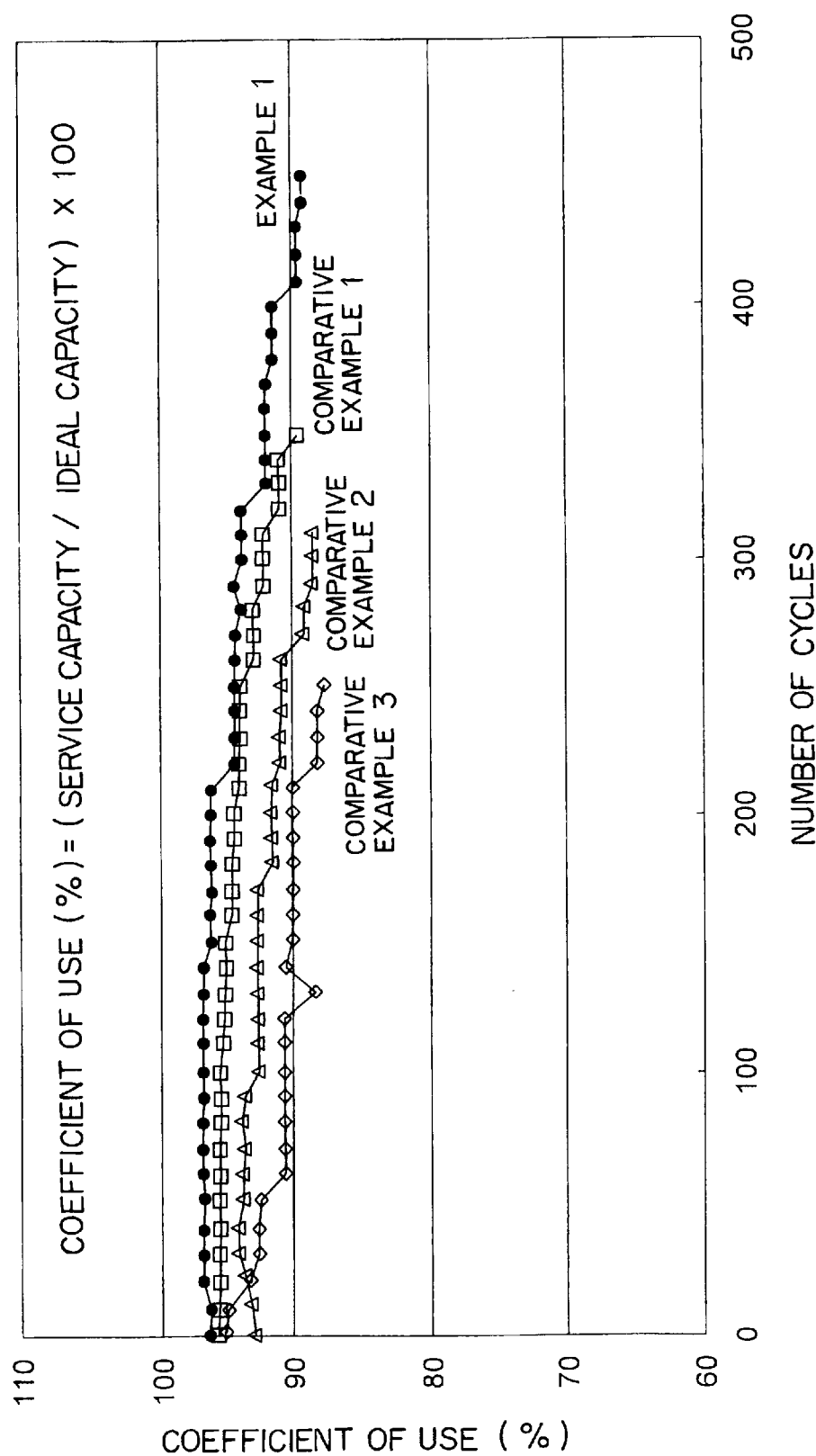
FIG. 9 is a graph showing the variation in cell coefficient of use in cycle characteristic tests in examples.

For the same reason, with respect to the variation in internal electrical resistance shown in FIG. 7 and the variation in decrease of the weight of the cell shown in FIG. 8, the variations in the negative electrode in Example 1 are lowest. With respect to the coefficient of use shown in FIG. 9, the negative electrode in Example 1 has highest and excellent characteristics.

In the cycle characteristic test, the thickness of the negative electrode before and after the test was measured. The results thereof are shown in Table 2.

TABLE 2

|  | Ex. 1 | C. Ex. 2 | C. Ex. 3 | C. Ex. 4 |
|---|---|---|---|---|
| Before Cycle Test (mm) | 0.37 | 0.37 | 0.37 | 0.37 |
| After Cycle Test (mm) | 0.38 | 0.38 | 0.38 | 0.46 |

As shown in Table 2, in Example 1, the thickness of the negative electrode plate barely varied before and after a charge and discharge cycle similar to Comparative Examples 1 and 2. It can be considered that in the case of the negative electrode in Comparative Example 2 wherein no convex portions were formed, the looseness of the electrode due to volume expansion was absorbed into the electrode, whereas in Example 1, the electrode was flattened to be absorbed into the surface 8 as shown in FIG. 2. In Comparative Example 3 wherein no convex portions were formed, it can be considered that the density of the alloy is too high to absorb the looseness of the electrode due to volume expansion, so that the negative electrode plate is thickened.

As described above in detail, since the surface portion of the negative electrode plate according to the present invention has a predetermined water repellent rate and a plurality of convex portions, it is possible to provide a metal hydride alloy electrode having excellent discharge characteristics, excellent gas absorptivity during charge, and an excellent cycle life without the need of complicated producing processes.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A metal hydride negative electrode for use in a nickel hydride cell, said metal hydride negative electrode comprising a substrate and a negative electrode plate which is formed by applying a hydrogen absorbing alloy composition containing a hydrogen absorbing alloy powder, a conductive material, a binder and a dispersing agent on said substrate, wherein said negative electrode plate has a surface portion which has a predetermined water repellent rate, and wherein said predetermined water repellent rate exceeds 40%.

2. A metal hydride negative electrode for use in a nickel hydride cell, said metal hydride negative electrode comprising a substrate and a negative electrode plate which is formed by applying a hydrogen absorbing alloy composition containing a hydrogen absorbing alloy powder, a conductive material, a binder and a dispersing agent on said substrate, wherein said negative electrode plate has a surface portion which has a predetermined water repellent rate, and wherein said convex portions are formed on the basis of the difference in specific gravity between said hydrogen absorbing alloy powder, said conductive material, said binder and said dispersing agent in said hydrogen absorbing alloy composition.

3. A metal hydride negative electrode for use in a nickel hydride cell, said metal hydride negative electrode comprising a substrate and a negative electrode plate which is formed by applying a hydrogen absorbing alloy composition containing a hydrogen absorbing alloy powder, a conductive material, a binder and a dispersing agent on said substrate, wherein said negative electrode plate has a surface portion which has a predetermined water repellent, and wherein said convex portions mainly comprise said conductive material and said binder.

4. A method for producing a metal hydride negative electrode for use in a nickel hydride cell, said method comprising the steps of:

arranging a substrate on an application table;

producing a paste hydrogen absorbing alloy composition containing a hydrogen absorbing alloy powder, a conductive material, a binder and a dispersing agent; and applying said hydrogen absorbing alloy composition on said substrate to dry and press said hydrogen absorbing alloy composition to form a negative electrode plate, wherein at said step of producing said hydrogen absorbing alloy composition, the amount of said dispersing agent with respect to the amount of said hydrogen absorbing alloy powder is set to be a predetermined part by weight so that said negative electrode plate has a surface portion having a water repellent property and a plurality of convex portions.

5. A method for producing a metal hydride negative electrode as set forth in claim 4, wherein said dispersing agent is water, and said amount of said dispersing agent is in the range of from 30 to 60 parts by weight with respect to 100 parts of said hydrogen absorbing alloy powder by weight.

6. A method for producing a metal hydride negative electrode as set forth in claim 4, wherein at said step of arranging the substrate on the application table, said substrate is horizontally arranged on said application table.

* * * * *